(12) United States Patent
Harada et al.

(10) Patent No.: US 11,826,976 B2
(45) Date of Patent: Nov. 28, 2023

(54) FRP MOLDING SYSTEM AND METHOD

(71) Applicant: IHI AEROSPACE CO., LTD., Tokyo (JP)

(72) Inventors: Takashi Harada, Tokyo (JP); Yu Shigenari, Tokyo (JP); Toyoharu Akimoto, Tokyo (JP)

(73) Assignee: IHI AEROSPACE CO., LTD., Tokyo (JP)

( * ) Notice: Subject to any disclaimer, the term of this patent is extended or adjusted under 35 U.S.C. 154(b) by 289 days.

(21) Appl. No.: 17/295,163

(22) PCT Filed: Mar. 8, 2019

(86) PCT No.: PCT/JP2019/009486
§ 371 (c)(1),
(2) Date: May 19, 2021

(87) PCT Pub. No.: WO2020/183545
PCT Pub. Date: Sep. 17, 2020

(65) Prior Publication Data
US 2022/0009178 A1 Jan. 13, 2022

(51) Int. Cl.
*B29D 99/00* (2010.01)
*B29C 70/46* (2006.01)
(Continued)

(52) U.S. Cl.
CPC .......... *B29D 99/001* (2013.01); *B29C 70/46* (2013.01); *B29C 70/54* (2013.01); *B29C 70/003* (2021.05);
(Continued)

(58) Field of Classification Search
CPC ....... B29C 70/34; B29C 70/46; B29C 70/461; B29C 70/54; B29C 70/541
See application file for complete search history.

(56) References Cited

U.S. PATENT DOCUMENTS 2,300,760 A * 11/1942 Amigo ................ B29C 70/46
264/296
3,383,266 A 5/1968 Helm
(Continued)

FOREIGN PATENT DOCUMENTS

CN 102933379 A 2/2013
CN 203613420 U 5/2014
(Continued)

OTHER PUBLICATIONS

Chinese Office Action dated Jun. 21, 2022 for Chinese Patent Application No. 201980073343.1.
(Continued)

*Primary Examiner* — Jerzi H Moreno Hernandez
(74) *Attorney, Agent, or Firm* — Volpe Koenig

(57) ABSTRACT

A fiber reinforced plastic (FRP) molding system in which FRP material, having stacked prepregs, is molded to manufacture an arc-shaped FRP component. The FRP molding system comprises inner and outer jig plates, a partial pressing device, and transfer devices. The jig plates are arc-shaped members having outer and inner surfaces that respectively fit with inner and outer surface shapes of the FRP component. The FRP material is sandwiched between the jig plates to form an integrated jig plate. The partial pressing device intermittently compresses a portion of the integrated jig plate in a radial direction orthogonal to an arc of the FRP component so that the FRP component is partially molded. The transfer devices intermittently move the compressed portion of the integrated jig plate by the partial pressing device. By repeating the partial pressing and the transport, the entire integrated jig plate is compressed to form the FRP component.

10 Claims, 7 Drawing Sheets

(51) Int. Cl.
*B29C 70/54* (2006.01)
*B29C 70/30* (2006.01)
B29K 101/10 (2006.01)
B29L 31/30 (2006.01)
B29C 70/00 (2006.01)

(52) U.S. Cl.
CPC ........ *B29C 70/302* (2021.05); *B29K 2101/10* (2013.01); *B29L 2031/3082* (2013.01)

(56) References Cited

U.S. PATENT DOCUMENTS

| | | |
|---|---|---|
| 4,904,436 A | 2/1990 | Rachal |
| 2008/0099131 A1* | 5/2008 | Umeda ................... B29C 70/56 156/201 |
| 2008/0230652 A1 | 9/2008 | Biornstad et al. |
| 2011/0206906 A1* | 8/2011 | Rubin ..................... B29C 53/04 156/203 |
| 2013/0142997 A1 | 6/2013 | Hofmann |
| 2017/0008217 A1 | 1/2017 | Chapman et al. |

FOREIGN PATENT DOCUMENTS

| | | |
|---|---|---|
| EP | 3549751 A1 | 10/2019 |
| JP | 62-019440 A | 1/1987 |
| JP | 2002-538991 A | 11/2002 |
| JP | 2004-322442 A | 11/2004 |
| JP | 3754313 B2 | 3/2006 |
| JP | 2008-222221 A | 9/2008 |
| JP | 2015-009396 A | 1/2015 |
| JP | 2017-061135 A | 3/2017 |
| PT | 2394909 T | 3/2017 |
| WO | 00/54951 A1 | 9/2000 |
| WO | 2018/101422 A1 | 6/2018 |

OTHER PUBLICATIONS

International Preliminary Report on Patentability dated Aug. 25, 2021 for PCT International Application No. PCT/JP2019/009486.
JP Office Action, Notification of Reasons for Refusal with English Translation, Japanese Patent Application No. 2019-529290, dated Jul. 8, 2020, 7 pgs.
Extended European Search Report dated Sep. 19, 2022 for European Patent Application No. 19919108.1.
Friedrich, K., "On stamp forming of curved and flexible geometry components from continuous glass fiber/polypropylene composites", Paper, Institute for Composite Materials Ltd., University of Kaiserlautern, Germany (1997).
Canadian Office Action dated Aug. 11, 2022 for Canadian Patent Application No. 3119802.

* cited by examiner

FRP MOLDING SYSTEM AND METHOD

TECHNICAL FIELD

The present invention relates to an FRP molding system and an FRP molding method for molding an arc-shaped large FRP component.

BACKGROUND ART

A fiber-reinforced composite material such as CFRP (carbon fiber reinforced plastic) has a lower density than those of metal materials such as iron and aluminum, but has excellent mechanical characteristics, and characteristically has high specific strength, lightweight, and toughness.

Hence, the fiber-reinforced composite material has been recently used in place of aluminum alloys as a structure member in aircrafts, compact ships, automobiles, and the like. Hereinafter, the fiber-reinforced composite material is simply called "FRP".

For example, structure components of an aircraft (such as a fuselage, hatches, and wings) have been formed by joining aluminum alloys with rivets. However, the joining with rivets is poor in workability, and rivets applied to a fiber-reinforced composite material cut inner fibers to extremely reduce the tensile strength.

To address this, for example, a technique disclosed in Patent Document 1 may be used to produce a large FRP molded product.

In the "method for producing an FRP molded product" according to Patent Document 1, a sheet-shaped FRP material containing a thermoplastic resin and reinforced fibers is laminated on a surface mat, and the whole is heated with a heater. Next, the FRP material on the surface mat is transferred and set in a mold of a press machine. Then, the FRP material on the surface mat is pressed by the press machine to give an FRP molded product in which the reinforced fibers and the surface mat are integrated with the thermoplastic resin.

CITATION LIST

Patent Literature

PTL 1: Japanese Patent Publication Laid-open No. 2015-009396

SUMMARY OF INVENTION

Technical Problem

Patent Document 1 has the following problems when a large FRP component (an arc-shaped FRP component having a radius of 1 m or more) such as the fuselage of an aircraft is molded.

(1) A large mold and a large press machine capable of pressing a large FRP component is required.

(2) To mold an arc-shaped FRP component, the component is required to be pressed in a radial direction orthogonal to the arc of the FRP component for homogeneity of the molded product.

In this case, the mold for pressing in a radial direction of the arc of an FRP component has a complicated structure.

The present invention has been made to solve the above problems. The present invention is therefore intended to provide an FRP molding system and an FRP molding method capable of entirely homogeneously molding an arc-shaped FRP component (for example, a large FRP component) by pressing in a radial direction of the arc without using a large or complicated mold.

Solution to Problem

The present invention provides an FRP molding system of molding a plate-shaped FRP material in which a plurality of prepregs are stacked, to give an arc-shaped FRP component, and the FRP molding system includes an arc-shaped inner jig plate having an outer surface that fits with an inner surface shape of the FRP component, an arc-shaped outer jig plate having an inner surface that fits with an outer surface shape of the FRP component, a partial pressing device configured to intermittently compress a part of an integrated jig plate in which the FRP material is interposed between the inner jig plate and the outer jig plate, in a radial direction orthogonal to the arc of the FRP component to partially mold the FRP component, and a transfer device configured to intermittently transfer the compressed portion of the integrated jig plate by the partial pressing device.

The present invention also provides an FRP molding method of molding a plate-shaped FRP material in which a plurality of prepregs are stacked, to give an arc-shaped FRP component, and the FRP molding method includes a jig preparation step of preparing an arc-shaped inner jig plate having an outer surface that fits with an inner surface shape of the FRP component and preparing an arc-shaped outer jig plate having an inner surface that fits with an outer surface shape of the FRP component, a jig integration step of interposing the FRP material between the inner jig plate and the outer jig plate to form an integrated jig plate, a partial press step of intermittently compressing a part of the integrated jig plate in a radial direction orthogonal to the arc of the FRP component to partially mold the FRP component, and a transfer step of intermittently transfer the compressed portion of the integrated jig plate by the partial press step, in which the partial press step and the transfer step are repeated.

Advantageous Effects of Invention

According to the present invention, in the partial press step, a part of the integrated jig plate in which the FRP material is interposed between the inner jig plate and the outer jig plate is intermittently compressed to partially mold the FRP component, and in the transfer step, the compressed portion of the integrated jig plate is intermittently transferred. By repeating the partial press step and the transfer step, an arc-shaped FRP component (for example, a large FRP component) can be produced by molding with a compact mold.

In the partial press step, a part of the integrated jig plate is compressed (pressed) in a radial direction orthogonal to the arc of the FRP component, and this eliminates the use of a complicated mold but enables entirely homogeneous molding of the FRP component.

DESCRIPTION OF EMBODIMENTS

Embodiments of the present invention will now be described in detail on the basis of the attached drawings. A component common in figures are indicated by the same sign and is not repeatedly described.

Figure 1A:
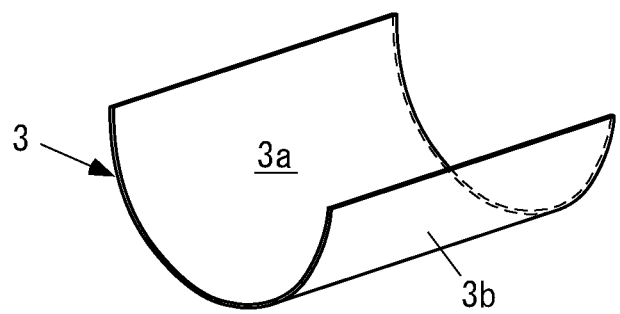
FIG. 1A is a perspective view of a typical FRP component produced by the present invention.
Figure 1B:
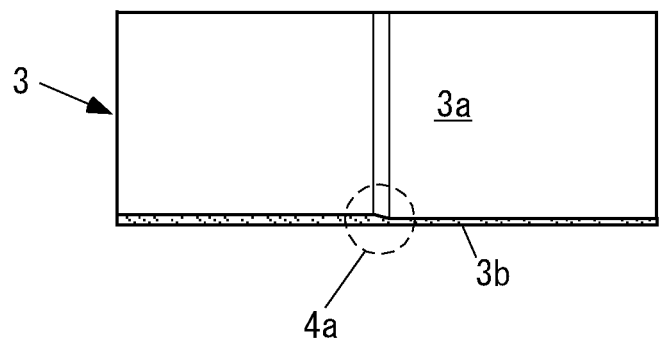
FIG. 1B is a side view of an FRP component having a deformed portion at the middle in the axis direction.
Figure 1C:
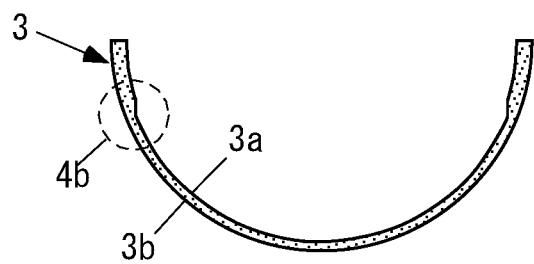
FIG. 1C is an end view of an FRP component having deformed portions at the edges in the circumferential direction.

FIG. 1A to FIG. 1C are views each illustrating an FRP component 3 produced by the present invention.

The FRP component 3 produced by the present invention is an arc-shaped FRP component 3 having a radius of 1 m or more. As examples, FIG. 1A is a perspective view of a typical FRP component 3, FIG. 1B is a side view of an FRP component 3 having a deformed portion 4a at the middle in the axis direction, and FIG. 1C is an end view of an FRP component 3 having deformed portions 4b at the edges in the circumferential direction.

An "arc-shaped FRP component 3 having a radius of 1 m or more" means a large FRP component such as the fuselage of an aircraft. The radius is, for example, 2 m and may be 1 to 10 m. The axis length (the length in the axis direction) is, for example, 8 m and may be 10 cm to 20 m.

"Arc-shaped" means, for example, having an arc with a constant radius as shown in FIG. 1A, but the radius may not be strictly constant and may be partially or continuously changed. The angle in the circumferential direction (arc angle) of an arc is preferably 180 degrees or less but may be more than 180 degrees as long as such a member does not interfere with the press frame 24 described later.

The thickness of the FRP component 3 in the radial direction is preferably constant but may be partially or continuously changed. For example, the component may include window frames and door portions of the fuselage of an aircraft.

The shape of the deformed portion 4a, 4b is so designed as not to interfere with the inner jig plate 10 and the outer jig plate 12 described later when the inner jig plate 10 and the outer jig plate 12 move in a radial direction orthogonal to the arc of an FRP component 3.

An FRP molding system 100 of the present invention uses an inner jig plate 10 and an outer jig plate 12.

Figure 2A:
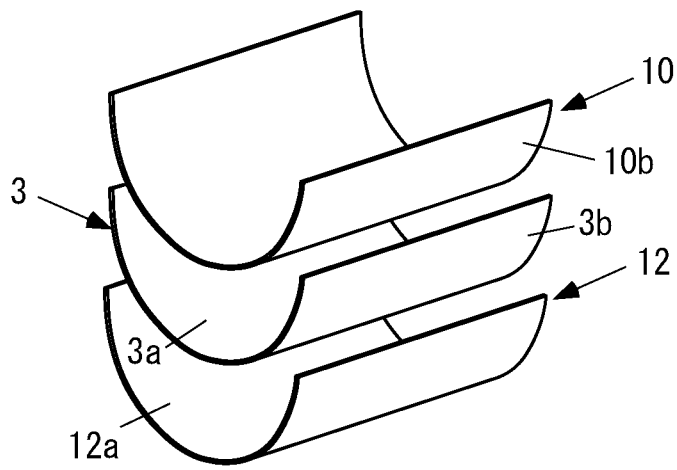
FIG. 2A is a perspective view of a typical inner jig plate and a typical outer jig plate.
Figure 2B:
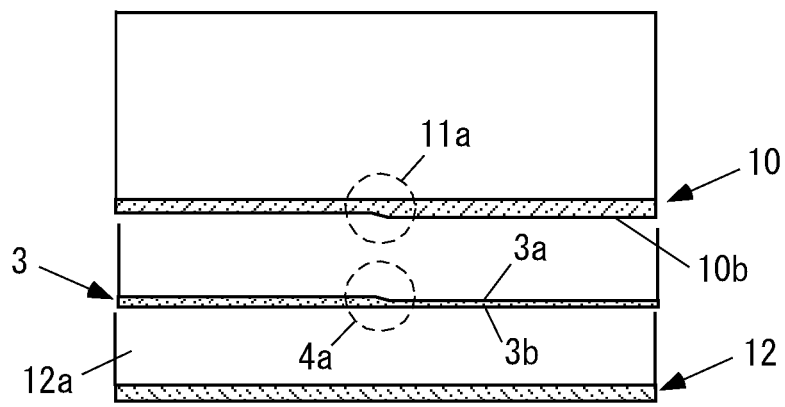
FIG. 2B is a side view of an inner jig plate having a deformed portion corresponding to a deformed portion of an FRP component at the middle in the axis direction and an outer jig plate.
Figure 2C:
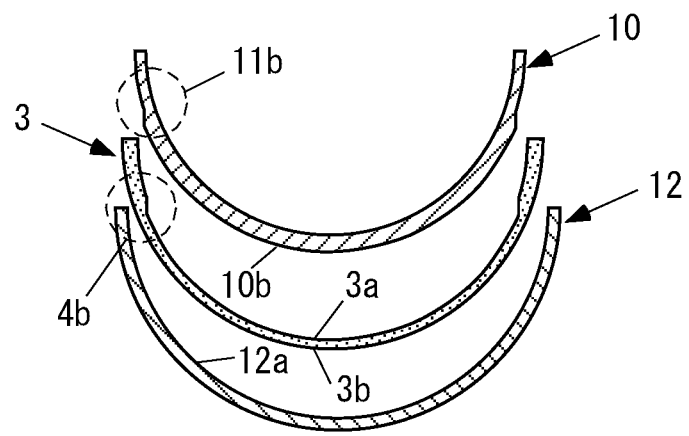
FIG. 2C is an end view of an inner jig plate having deformed portions corresponding to deformed portions of an FRP component at the edges in the circumferential direction and an outer jig plate.

FIG. 2A to FIG. 2C are views each illustrating an inner jig plate 10 and an outer jig plate 12. As an example, FIG. 2A is a perspective view of a typical inner jig plate 10 and a typical outer jig plate 12. FIG. 2B is a side view of an inner jig plate 10 and an outer jig plate 12. The inner jig plate 10 has a deformed portion 11a corresponding to a deformed portion 4a of an FRP component 3 at the middle in the axis direction. FIG. 2C is an end view of an inner jig plate 10 having deformed portions 11b corresponding to deformed portions 4b of an FRP component 3 at the edges in the circumferential direction and an outer jig plate 12.

Each of the inner jig plate 10 and the outer jig plate 12 is an arc-shaped member. The inner jig plate 10 and the outer jig plate 12 are made from a metal or a high heat-resistant resin (for example, polyimide) and have such a property as not to be plastically deformed at the time of molding of an FRP component 3. The inner jig plate 10 and the outer jig plate 12 may be elastically deformed at the time of molding of an FRP component 3.

As shown in FIG. 2A, the inner jig plate 10 has an outer surface 10b that fits with the inner surface shape 3a of an FRP component 3. The outer jig plate 12 has an inner surface 12a that fits with the outer surface shape 3b of the FRP component 3.

"Fitting" means that members have the corresponding male and female shapes and form no clearance therebetween when the members come in close contact with each other.

Each of the inner jig plate 10 and the outer jig plate 12 has a surface shape corresponding to a change in plate thickness or a change in curvature of an FRP component 3 therebetween.

As an example, the inner jig plate 10 in FIG. 2B has a deformed portion 11a corresponding to a deformed portion 4a of an FRP component 3 at the middle in the axis direction. The inner jig plate 10 in FIG. 2C has deformed portions 11b corresponding to deformed portions 4b of an FRP component 3 at the edges in the circumferential direction.

The FRP molding system 100 of the present invention is an apparatus for molding a plate-shaped FRP material 2 in which a plurality of prepregs 1 are stacked, to produce an arc-shaped FRP component 3 having a radius of 1 m or more.

A "prepreg 1" is an intermediate material formed by impregnating a base material made from reinforced fibers (for example, glass fibers or carbon fibers) with a resin. In the present invention, the resin is preferably a thermoplastic resin but may be a thermosetting resin.

Before molding, the thermoplastic resin is solidified, whereas the thermosetting resin is softened (uncured).

The FRP molding system 100 of the present invention uses an integrated member (hereinafter called "integrated jig plate 14") in which an FRP material 2 is interposed between an inner jig plate 10 and an outer jig plate 12.

Figure 3A:
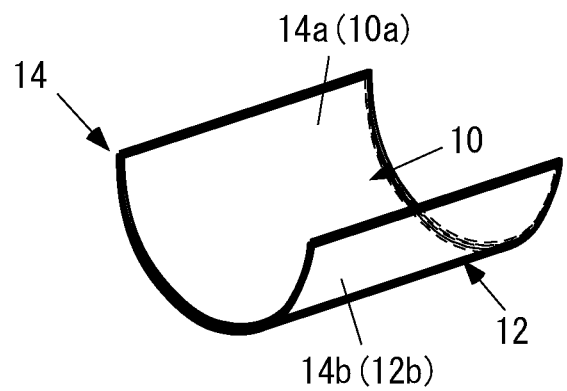
FIG. 3A is a perspective view of a typical integrated jig plate in which an FRP material is interposed between the inner jig plate and the outer jig plate in FIG. 2A.
Figure 3B:
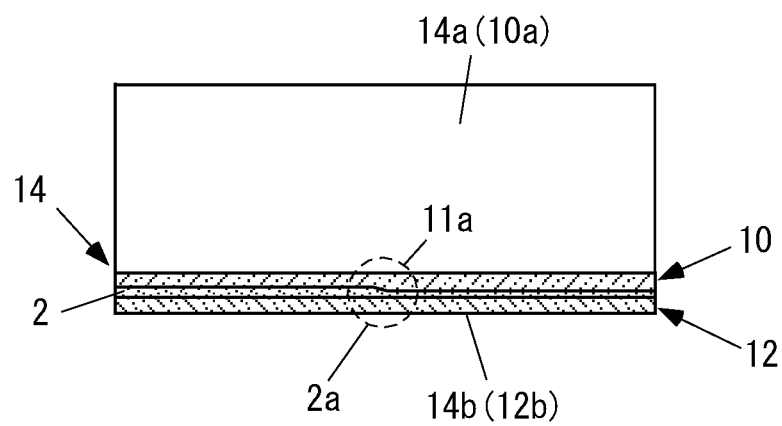
FIG. 3B is a side view of an integrated jig plate in which an FRP material is interposed between the inner jig plate and the outer jig plate in FIG. 2B.
Figure 3C:
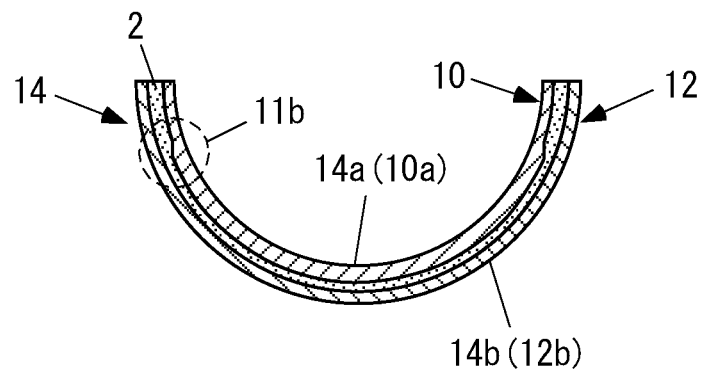
FIG. 3C is an end view of an integrated jig plate in which an FRP material is interposed between the inner jig plate and the outer jig plate in FIG. 2C.

FIG. 3A to FIG. 3C are views each illustrating an integrated jig plate 14. In the figures, an FRP material 2 is sandwiched between the inner jig plate 10 and the outer jig plate 12 at the position of the FRP component 3 in FIG. 2A to FIG. 2C.

FIG. 3A is a perspective view of a typical integrated jig plate 14 in which an FRP material 2 is interposed between the inner jig plate 10 and the outer jig plate 12 in FIG. 2A. FIG. 3B is a side view of an integrated jig plate 14 in which an FRP material 2 is interposed between the inner jig plate 10 and the outer jig plate 12 in FIG. 2B. FIG. 3C is an end view of an integrated jig plate 14 in which an FRP material 2 is interposed between the inner jig plate 10 and the outer jig plate 12 in FIG. 2C.

In FIG. 3B, the FRP material 2 has a deformed portion 2a corresponding to the deformed portion 4a of the FRP component 3. The same is applied to FIG. 3C.

To produce an FRP component 3 having neither the change in plate thickness nor the change in curvature, no inner jig plate 10 or no outer jig plate 12 may be used.

The inner jig plate 10 and the outer jig plate 12 are fixed to each other with a fixture (not shown) so as not to separate from each other while an FRP material 2 is sandwiched therebetween.

The fixture is so designed as not to interfere with the upper mold 16 and the lower mold 18 described later when the lower mold 18 is pressed against the upper mold 16 and is designed such that the outer jig plate 12 is movable relative to the inner jig plate 10 in a radial direction orthogonal to the arc of an FRP component 3.

An "FRP material 2" is a material that is formed by stacking a plurality of prepregs 1 and is to give an FRP component 3 after molding. The FRP material 2 is preferably a plate member.

The FRP material 2 is a contour-like laminate that matches the plate thickness distribution of an FRP component 3. The FRP material 2 may be a planar laminate or a laminate having an arc shape corresponding to a molded product.

The thickness of an FRP material 2 corresponds to the thickness of an FRP component 3 in a radial direction and is set in consideration of a change in thickness at the time of molding. The stacking number of prepregs 1 is preferably changed with a change in thickness of an FRP component 3.

The width of an FRP material 2 corresponds to the length of the arc of an FRP component 3 in the circumferential direction. The length of an FRP material 2 corresponds to the length of an FRP component 3 in the axis direction.

The inner surface 14a and the outer surface 14b of the integrated jig plate 14 have concentric arc surfaces each having a constant radius.

In the example, the inner surface 14a of the integrated jig plate 14 is the inner surface 10a of the inner jig plate 10, and the outer surface 14b of the integrated jig plate 14 is the outer surface 12b of the outer jig plate 12. Hence, the inner surface 10a of the inner jig plate 10 and the outer surface 12b of the outer jig plate 12 have substantially concentric arc surfaces each having a constant radius when the plates are integrated while an FRP material 2 is interposed therebetween.

In the description, "substantially concentric" means that arc surfaces are not strictly concentric due to the thickness of an FRP material 2 before molding but become concentric after molding.

Figure 4A:
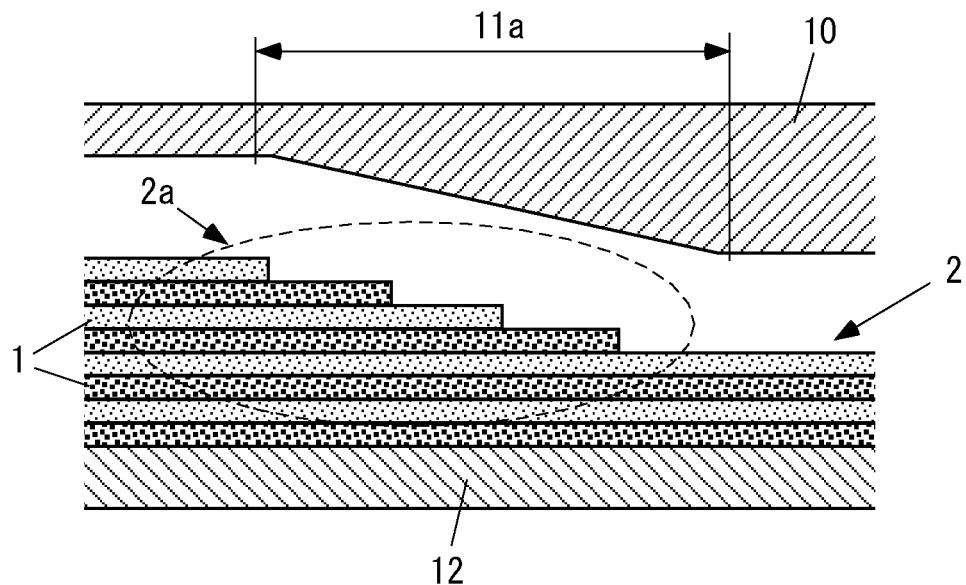
FIG. 4A is a view showing a deformed portion of an FRP material.
Figure 4B:
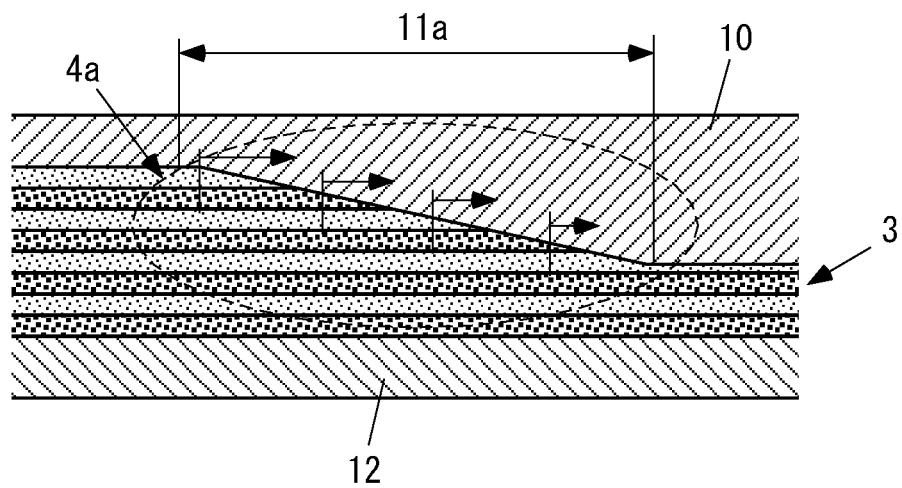
FIG. 4B is a view showing a deformed portion of an FRP component.

FIG. 4A is a view showing a deformed portion 2a of an FRP material 2, and FIG. 4B is a view showing a deformed portion 4a of an FRP component 3.

As shown in FIG. 4A, the deformed portion 2a of an FRP material 2 is formed, for example, by changing the stacking number of prepregs 1. The fiber directions of prepregs 1 are preferably different from each other, but some or all of the fiber directions may be the same. In this case, the thickness of stacked prepregs is set to be a deformation amount more than the thickness of an FRP component 3 in consideration of a change in thickness at the time of molding.

In this case, the deformed portion 2a of the FRP material 2 has a stepped shape due to the thickness of each prepreg 1. For example, at the end position of a prepreg 1, a resin and fibers flow in the in-plane direction at the time of molding due to a change in thickness (a reduction in thickness) of the FRP material 2. Hence, the deformed portion 2a of the FRP material 2 is preferably designed to locate in the area of a deformed portion 11a of the inner jig plate 10, but the design is not limited thereto.

In FIG. 4B, when the integrated jig plate 14 is compressed in the vertical direction in the figure, the clearance between the inner jig plate 10 and the outer jig plate 12 is reduced, and the FRP material 2 therebetween is molded to give an FRP component 3.

During the molding, when the resin is a thermoplastic resin, the resin is heated and then cooled, whereas when the resin is a thermosetting resin, the resin is heated to be cured.

At the time of molding of an FRP material 2, a part of the resin and the fibers flow to move, and a deformed portion 4a of the FRP component 3 in close contact with the deformed portion 11a of the inner jig plate 10 is formed as shown in FIG. 4B.

Figure 5A:
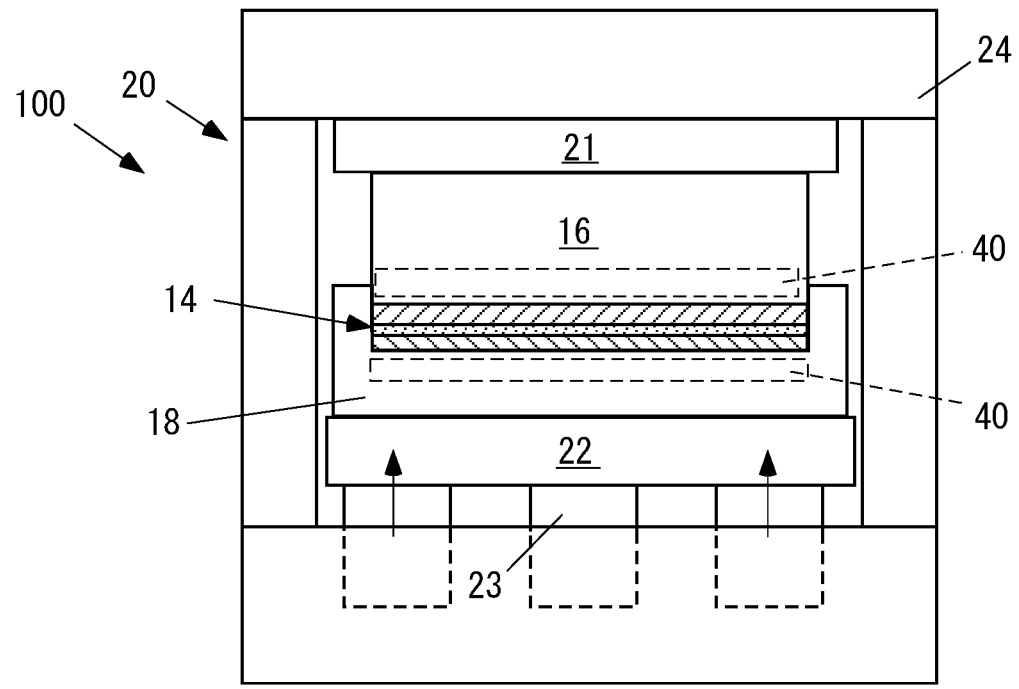
FIG. 5A is a front view of an FRP molding system according to the present invention.
Figure 5B:
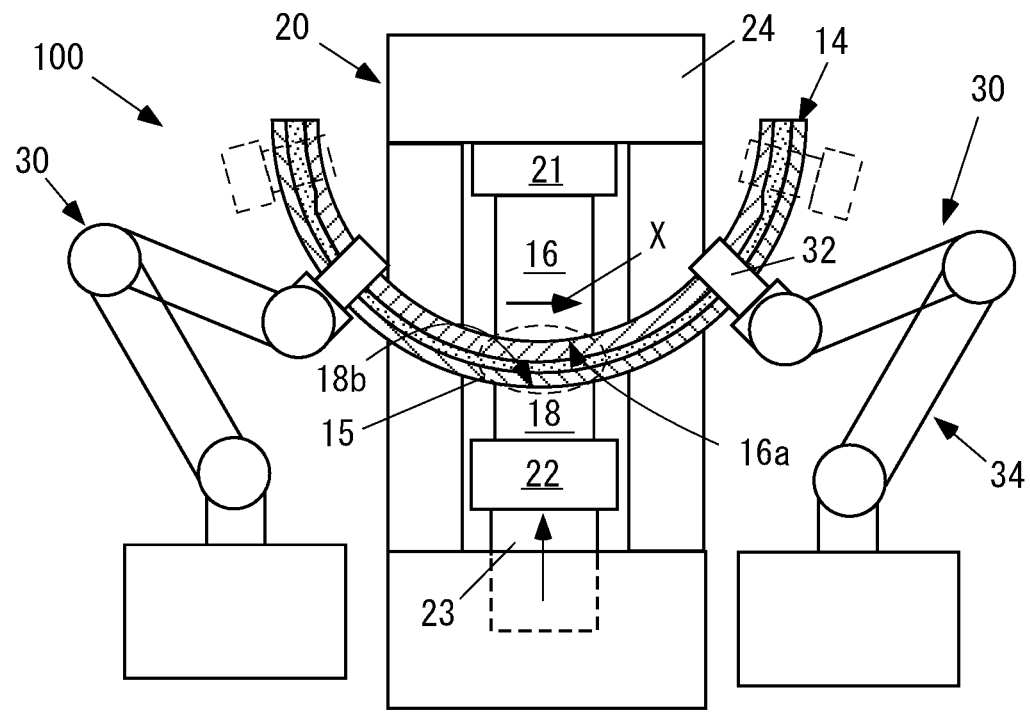
FIG. 5B is a side view of FIG. 5A.

FIG. 5A is a front view of an FRP molding system 100 according to the present invention, and FIG. 5B is a side view thereof. FIG. 5B shows the system during molding.

In FIG. 5A and FIG. 5B, the FRP molding system 100 further includes an upper mold 16 and a lower mold 18.

Between the upper mold 16 and the lower mold 18, a part (press portion 15) of the integrated jig plate 14 is interposed in the vertical direction.

The upper mold 16 has an inner arc surface 16a to be in close contact with the inner surface 14a of the integrated jig plate 14. The lower mold 18 has an outer arc surface 18b to be in close contact with the outer surface 14b of the integrated jig plate 14.

In the example, the upper mold 16 and the lower mold 18 simultaneously compress the entire axis length (the length in the axis direction) of the integrated jig plate 14.

In FIG. 5A and FIG. 5B, the FRP molding system 100 further includes a partial pressing device 20 and transfer devices 30.

The partial pressing device 20 intermittently compresses a part (press portion 15) of the integrated jig plate 14 in a radial direction orthogonal to the arc of an FRP component 3 (vertical direction in the figure) to partially mold the FRP component 3.

"Intermittently compressing" means that compression and transfer of the integrated jig plate 14 are repeated by the partial pressing device 20 and the transfer devices 30.

The partial pressing device 20 compresses a part of the integrated jig plate 14 with the upper mold 16 and the lower mold 18.

In the example, the partial pressing device 20 includes an upper bolster 21 that fixes the upper mold 16 onto the bottom face, a slide 22 that fixes the lower mold 18 onto the top face, a hydraulic ram 23 that vertically reciprocates the slide 22, and a press frame 24 to which the upper bolster 21 and the hydraulic ram 23 are fixed.

In the example, the partial pressing device 20 lifts the lower mold 18 toward the upper mold 16 to compress the press portion 15 of the integrated jig plate 14. In this case, the partial pressing device 20 compresses the press portion 15 in a diameter direction of the inner arc surface 16a or the outer arc surface 18b.

The upper structure of the press frame 24 is so designed as not to interfere with the integrated jig plate 14 when a compressed portion of the integrated jig plate 14 is intermittently transferred.

As long as the press upper structure does not interfere with the integrated jig plate 14, the vertical relation between the bolster and the slide 22 and the hydraulic ram 23 may be reversed. In other words, the slide 22 and the hydraulic ram 23 may be located in the upper portion, and the bolster may be located in the lower portion.

The transfer devices 30 intermittently transfer the compressed portion (press portion 15) of the integrated jig plate 14 by the partial pressing device 20.

Each transfer device 30 has a holder 32 and a carrier 34.

The holder 32 partially holds the integrated jig plate 14. The carrier 34 carries the holder 32 in the transfer direction X of the integrated jig plate 14.

In the example, the transfer direction X of the integrated jig plate 14 is the circumferential direction along the arc of the FRP component 3. The carrier 34 is, for example, an articulated robot, and the holder 32 is a robot hand.

In the example, a pair of transfer devices 30 are provided at the upstream side and the downstream side of the partial pressing device 20, but a transfer device may be provided at one of the upstream side and the downstream side.

The holder 32 holds a non-compressed portion of the integrated jig plate 14. In this case, for example, a held portion may be changed during compression by the partial pressing device 20.

In FIG. 5A and FIG. 5B, the FRP molding system 100 further includes a heater 40 for heating the upper mold 16 or the lower mold 18.

The heater 40 has a predetermined temperature distribution in the transfer direction X of the integrated jig plate 14.

Figure 6A:
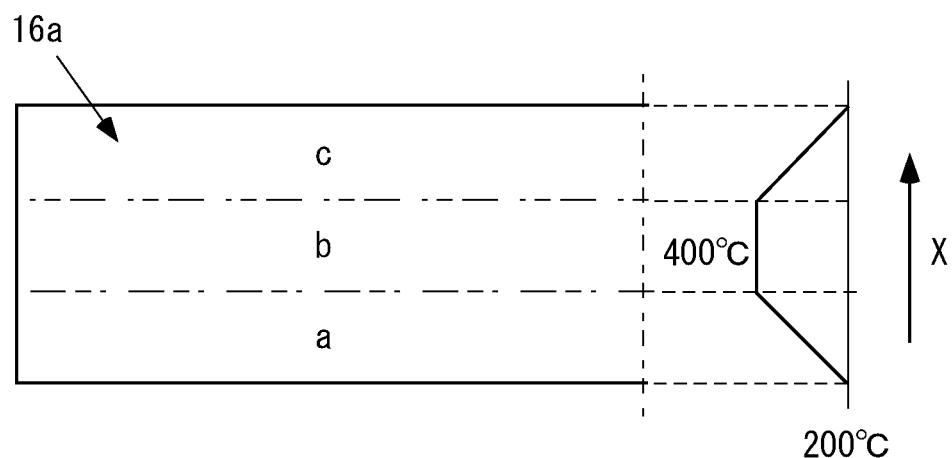
FIG. 6A is a diagram illustrating a temperature distribution of an upper mold.
Figure 6B:
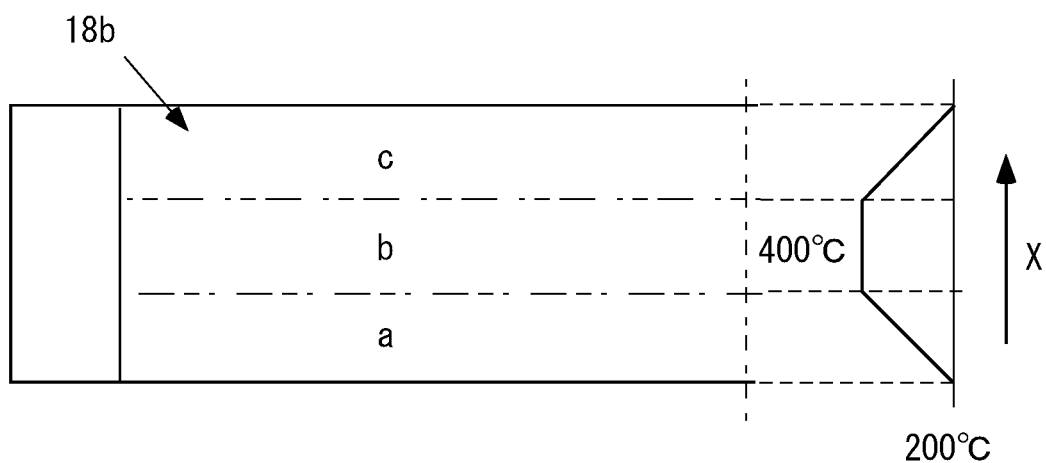
FIG. 6B is a diagram illustrating a temperature distribution of a lower mold.

FIG. 6A is a diagram illustrating a temperature distribution of the upper mold 16, and FIG. 6B is a diagram illustrating a temperature distribution of the lower mold 18.

In the example, prepregs 1 contain a thermoplastic resin. FIG. 6A shows the inner arc surface 16a of the upper mold 16, and FIG. 6B shows the outer arc surface 18b of the lower mold 18. In each drawing, signs a, b, and c indicate a preheating zone, a main molding zone, and a cooling zone, respectively.

In the example, in the temperature distributions of the upper mold 16 and the lower mold 18, the central part (main molding zone b) in the transfer direction X of the integrated jig plate 14 has a temperature not less than a melting temperature at which the thermoplastic resin flows (for example, 400° C. or more). The upstream side (preheating zone a) and the downstream side (cooling zone c) from the central part in the transfer direction X have temperatures not more than a solidification temperature at which the thermoplastic resin solidifies (for example, 200° C. to less than 400° C.)

The reason why the preheating zone a and the cooling zone c are set at temperatures not more than a solidification temperature is as follows: if the whole surface is heated to a temperature not less than a melting temperature, heat transfer softens an uncompressed portion of, for example, a CFRP having a high thermal conductivity, then, for example, once-compressed extremely small bubbles expand in the off-plate direction, and this makes it difficult to entirely homogeneously mold an FRP component 3.

The above temperature distribution is a temperature distribution at the time of molding of an FRP component 3, and at the time of transfer, the inner arc surface 16a and the outer arc surface 18b are preferably entirely 200° C. or less.

Meanwhile, when prepregs 1 contain a thermosetting resin, in the temperature distribution, the central part (main molding zone b) in the transfer direction X of the integrated jig plate 14 has a temperature not less than a curing temperature at which the thermosetting resin is cured. The thermosetting resin, for example, has a curing temperature of about 180° C. The upstream side (preheating zone a) from the central part in the transfer direction X is heated to a temperature less than the curing temperature. For the thermosetting resin, the cooling zone c is unnecessary and can be excluded.

Figure 7:
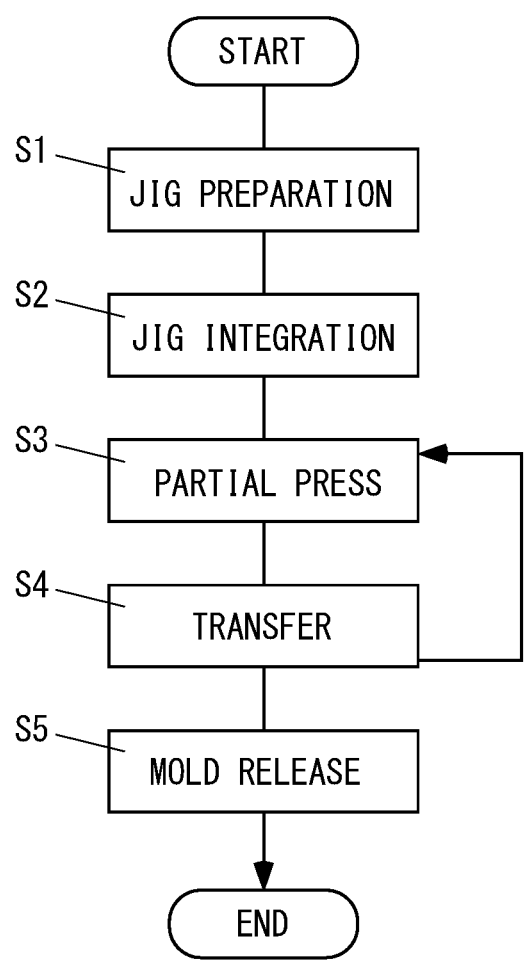
FIG. 7 is an entire flow chart of an FRP molding method according to the present invention.

FIG. 7 is an entire flow chart of an FRP molding method according to the present invention.

The FRP molding method according to the present invention is a method of molding a plate-shaped FRP material 2 in which a plurality of prepregs 1 are stacked, to give an arc-shaped FRP component 3 having a radius of 1 m or more.

In the figure, the FRP molding method includes steps S1 to S5.

In a jig preparation step S1, an arc-shaped inner jig plate 10 having an outer surface 10b that fits with an inner surface shape 3a of an FRP component 3 and an arc-shaped outer jig plate 12 having an inner surface 12a that fits with an outer surface shape 3b of the FRP component 3 are prepared.

In a jig integration step S2, an FRP material 2 is interposed between the inner jig plate 10 and the outer jig plate 12 to form an integrated jig plate 14. In the jig integration step S2, onto the outer surface 10b of the inner jig plate 10 and the inner surface 12a of the outer jig plate 12, a mold release agent (for example, a fluorine mold release agent) is preferably applied.

In a partial press step S3, a part of the integrated jig plate 14 is intermittently compressed in a radial direction orthogonal to the arc of the FRP component 3 to partially mold the FRP component 3.

In a transfer step S4, the compressed portion (press portion 15) of the integrated jig plate 14 by the partial press step S3 is intermittently transferred.

The partial press step S3 and the transfer step S4 are repeated to wholly compress the integrated jig plate 14, and the FRP component 3 is entirely molded.

In a mold release step S5, the inner jig plate 10 and the outer jig plate 12 are separated from the integrated jig plate 14, and the molded FRP component 3 is released.

According to the above embodiment of the present invention, in the partial press step S3, a part of the integrated jig plate 14 in which an FRP material 2 is interposed between the inner jig plate 10 and the outer jig plate 12 is intermittently compressed to partially mold an FRP component 3. In the transfer step S4, the compressed portion (press portion 15) of the integrated jig plate 14 is intermittently transferred. By repeating the partial press step S3 and the transfer step S4, an arc-shaped FRP component 3 (for example, a large FRP component having a radius of 1 m or more) can be produced by molding with a compact mold.

In the partial press step S3, a part of the integrated jig plate 14 is compressed (pressed) in a radial direction orthogonal to the arc of the FRP component 3, and thus the FRP component 3 can be entirely homogeneously molded without using a complicated mold.

The present invention is not limited to the above embodiments, and needless to say, various modifications can be made without departing from the scope of the present invention.

For example, in the above example, the FRP component 3 has an arc shape, but the present invention is also applicable to a flat FRP component.

| Reference Signs List | |
|---|---|
| a | preheating zone, |
| b | main molding zone, |
| c | cooling zone, |
| X | transfer direction, |
| 1 | prepreg, |
| 2 | FRP material, |
| 2a, 2b | deformed portion, |
| 3 | FRP component |
| 3a | inner surface shape, |
| 3b | outer surface shape, |
| 4a, 4b | deformed portion, |
| 10 | inner jig plate, |
| 10a | inner surface, |
| 10b | outer surface, |
| 11a, 11b | deformed portion, |
| 12 | outer jig plate, |
| 12a | inner surface, |
| 12b | outer surface, |
| 14 | integrated jig plate, |
| 14a | inner surface, |
| 14b | outer surface, |
| 15 | press portion (compressed portion), |
| 16 | upper mold, |
| 16a | inner arc surface, |
| 18 | lower mold, |
| 18b | outer arc surface, |
| 20 | partial pressing device |
| 21 | upper bolster, |
| 22 | slide, |
| 23 | hydraulic ram, |
| 24 | press frame, |
| 30 | transfer device, |
| 32 | holder (robot hand), |
| 34 | carrier (articulated robot), |
| 40 | heater, |
| 100 | FRP molding system |

The invention claimed is:

1. A fiber reinforced plastic (FRP) molding system for molding a plate-shaped FRP material in which a plurality of prepregs are stacked into an arc-shaped FRP component, the FRP molding system comprising:
an arc-shaped inner jig plate having an outer surface that fits with an inner surface shape of the FRP component;
an arc-shaped outer jig plate having an inner surface that fits with an outer surface shape of the FRP component;
a partial pressing device configured to intermittently compress a part of an integrated jig plate in which the FRP material is interposed between the inner jig plate and the outer jig plate, in a radial direction orthogonal to the arc of the FRP component to partially mold the FRP component; and
a transfer device configured to intermittently transfer the compressed portion of the integrated jig plate by the partial pressing device.

2. The FRP molding system according to claim 1, wherein the inner jig plate and the outer jig plate have, therebetween, surface shapes corresponding to a change in plate thickness or a change in curvature of the FRP component, and
the integrated jig plate has an inner surface and an outer surface that have concentric arc surfaces each having a constant radius.

3. The FRP molding system according to claim 2, the partial pressing device further comprising an upper mold and a lower mold, the part of the integrated jig plate being interposed between the upper mold and the lower mold, wherein
the upper mold has an inner arc surface to be in close contact with the inner surface of the integrated jig plate,
the lower mold has an outer arc surface to be in close contact with the outer surface of the integrated jig plate, and
the partial pressing device is to compress the part with the upper mold and the lower mold.

4. The FRP molding system according to claim 3, further comprising a heater configured to heat the upper mold or the lower mold, wherein
the heater has a predetermined temperature distribution in a transfer direction of the integrated jig plate.

5. The FRP molding system according to claim 4, wherein the prepregs contain a thermoplastic resin, and wherein in the temperature distribution, a central part in the transfer direction has a temperature not less than a melting temperature at which the thermoplastic resin flows, and an upstream side and a downstream side from the central part have a temperature not more than a solidification temperature at which the thermoplastic resin solidifies.

6. The FRP molding system according to claim 4, wherein the prepregs contain a thermosetting resin, and wherein in the temperature distribution, a central part in the transfer direction has a temperature not less than a curing temperature at which the thermosetting resin is cured.

7. The FRP molding system according to claim 1, wherein the transfer device has a holder configured to partially hold the integrated jig plate and has a carrier configured to carry the holder in a transfer direction of the integrated jig plate.

8. A fiber reinforced plastic (FRP) molding method for molding a plate-shaped FRP material in which a plurality of prepregs are stacked into an arc-shaped FRP component, the FRP molding method comprising:
a jig preparation step of preparing an arc-shaped inner jig plate having an outer surface that fits with an inner surface shape of the FRP component and preparing an arc-shaped outer jig plate having an inner surface that fits with an outer surface shape of the FRP component;
a jig integration step of interposing the FRP material between the inner jig plate and the outer jig plate to form an integrated jig plate;
a partial press step of intermittently compressing a part of the integrated jig plate in a radial direction orthogonal to the arc of the FRP component to partially mold the FRP component; and
a transfer step of intermittently transfer the compressed portion of the integrated jig plate by the partial press step, wherein
the partial press step and the transfer step are repeated.

9. The FRP molding method according to claim 8, further comprising a mold release step of separating the inner jig plate and the outer jig plate from the integrated jig plate to release the molded FRP component.

10. The FRP molding method according to claim 8, wherein in the jig integration step, onto the outer surface of the inner jig plate and the inner surface of the outer jig plate, a mold release agent is applied.

* * * * *